United States Patent [19]
Bauer et al.

[11] Patent Number: 5,617,281
[45] Date of Patent: Apr. 1, 1997

[54] LOW COST CIRCUIT CONTROLLER

[75] Inventors: James A. Bauer, Asheville; Nelson R. Palmer, Arden, both of N.C.; Kathryn M. Palmer; Henry A. Wehrli, III, both of Monroeville, Pa.

[73] Assignee: Eaton Corporation, Cleveland, Ohio

[21] Appl. No.: 251,873

[22] Filed: Jun. 1, 1994

[51] Int. Cl.$^6$ ..................................................... H02H 5/04
[52] U.S. Cl. ............................. 361/27; 361/24; 361/106; 338/22 R
[58] Field of Search ........................... 338/22 R; 361/24, 361/31, 27–28, 103, 106

[56] References Cited

U.S. PATENT DOCUMENTS

| | | | |
|---|---|---|---|
| 4,315,237 | 2/1982 | Middleman et al. | 338/22 R |
| 4,549,161 | 10/1985 | McTavish et al. | 338/20 |
| 4,893,102 | 1/1990 | Bauer | 335/132 |
| 5,296,996 | 3/1994 | Hansson et al. | 361/24 |

OTHER PUBLICATIONS

Klockner–Moeller Main Catalogue (HPL 90/91 GB, FLs/Br), pp. 9/1–9/28, published May 1990 in the Federal Republic of Germany.

*Primary Examiner*—Jeffrey A. Gaffin
*Assistant Examiner*—Michael J. Sherry
*Attorney, Agent, or Firm*—Martin J. Moran

[57] ABSTRACT

A circuit controller for selectively connecting a power source to a load includes a switching mechanism, which selectively connects the power source to the load and switches a current which flows through the switching mechanism, and a substantially radiant energy dissipating positive temperature coefficient current limiter for limiting the current which flows through the switching mechanism. The switching mechanism includes a current sensor, which senses the current flowing through the switching mechanism and provides a sensed current value, and a switching controller for disconnecting the power source from the load whenever the sensed current value is above a predetermined current value. The switching mechanism may include a contactor having separable contacts which are responsive to the switching controller. The current limiter may have a first resistance which results from a first series current, and a higher second resistance which results from a second series current. The ratio of the second resistance to the first resistance may exceed 16. The current limiter may be a tungsten or, alternatively, a carbon conductor. The tungsten conductor dissipates greater than 70 percent of the energy of the short circuit current by radiation. The current limiter may further include a tubular glass cylinder which encloses the conductor therein. The cylinder may have two copper ends, each of which are electrically connected to a corresponding end of the conductor within the cylinder. The cylinder may further enclose a non-oxidizing gas, such as nitrogen, helium, argon, krypton or a halogen gas mixture. The conductor may be wound on a ceramic cylinder within the cylinder.

3 Claims, 6 Drawing Sheets

LOW COST CIRCUIT CONTROLLER

CROSS REFERENCE TO RELATED APPLICATIONS

The inventions taught herein are related to a concurrently filed commonly assigned copending application Ser. No. 08/252,880 entitled "CURRENT LIMITING CIRCUIT CONTROLLER" by James A. Bauer et al.. The inventions taught herein are further related to commonly assigned copending application Ser. No. 08/161,040 entitled "INTEGRAL ELECTRICAL CIRCUIT CONTROLLER" filed Dec. 3, 1993 and application Ser. No. 08/161,017 entitled "COMBINATION LOAD CONTROLLER" filed Dec. 3, 1993.

BACKGROUND OF THE INVENTION

1. Field of the Invention

This invention relates to an electrical circuit controller for protecting a power circuit and a load powered by the power circuit, and more particularly to a contactor having an external tungsten series current limiter for providing low cost current limiting protection in the power circuit.

2. Background of Information

Electromagnetic contactors are electrically operated switches used for controlling motors and other types of electrical loads. Contactors include a set of movable electrical contacts which are brought into contact with a set of fixed electrical contacts to close the contactor and connect a power line to the load. The set of movable contacts are separated from the set of fixed contacts to open the contactor.

Contactors also include a magnetic circuit having a fixed magnet and a movable armature with an air gap therebetween when the contactor is opened. An electromagnetic coil is controllable upon command to interact with a source of voltage for electromagnetically accelerating the armature towards the fixed magnet, thus reducing the air gap. Disposed on the armature is the set of movable contacts. The complementary set of fixed contacts are fixedly disposed within the contactor case and engage the movable contacts as the magnetic circuit is energized and the armature is moved. The load and voltage source therefor are interconnected with the fixed contacts and become interconnected with each other as the movable contacts make with the fixed contacts.

Contact erosion in contactors primarily occurs during a contact breaking cycle. During such cycle, the separable contacts (i.e., the fixed contacts and the movable contacts) part and the current flowing therethrough forms an arc. Continued arcing eventually interferes with the ability of the separable contacts to conduct electricity. The surface of the separable contacts may become eroded, pitted or may have carbon build-up.

A motor-starting contactor with a thermal overload protection relay system is called a motor starter. The purpose of the overload relay is to sense heat produced by line current and "trip" or stop the motor if the retained heat exceeds an acceptable level. State of the art overload protection relay systems include current sensors which output a voltage proportional to the current. After an analog-to-digital conversion of the voltage, a microprocessor squares and integrates the converted digital value to achieve a true measure of motor heating. This approach provides an accurate degree of motor protection. However, the overload relay cannot effectively interrupt a short circuit current. Without additional circuit protection, the short circuit current may damage the separable contacts of the contactor.

Circuit breakers are generally used to protect electrical circuitry from damage due to an overcurrent condition, such as an overload fault or a relatively high level short circuit condition. An overload fault condition is normally about 125–600 percent of the nominal current rating of the circuit breaker. A high level short circuit condition can be 1000 percent or more of the nominal current rating of the circuit breaker. For example, in a bolted three phase line-ground fault, the short circuit current may exceed 100 KA at 480 VAC.

In conventional motor starter installations, a three-phase power source powers a motor through a circuit breaker and a separate motor starter having an overload protection relay. The circuit breaker generally provides both overcurrent protection and power circuit disconnection functions. Under short circuit fault conditions, the circuit breaker acts first to protect the power circuit. This is because the motor starter trip characteristics are generally designed for interrupting, after an $I^2t$ time delay period, persistent overload currents associated with motor overloads. In the event of a motor starter failure, involving welded contacts, the circuit breaker may also be used to disconnect the power source from the motor.

Various proposals have been advanced for limiting short circuit fault currents in conventional motor starter installations. International Application Number PCT/SE91/00076 discloses a circuit breaker comprising a trip circuit, a trip coil, a set of contacts responsive to the trip coil, and a positive temperature coefficient conductive polymer thermistor in series with the set of contacts. The thermistor limits the magnitude of the short-circuit current. The coil of the trip circuit rapidly opens the contacts within approximately 5 ms after a fault current exceeds five to ten times rated current.

It has also been proposed to incorporate a nichrome current limiting resistive element in series with the line conductor of a circuit breaker in order to limit the maximum short circuit current.

These proposals require a circuit breaker for rapidly interrupting the short circuit fault current. Furthermore, they are subject to an internal temperature rise because of the resistive ($I^2R$) heating of the current limiter. This temperature rise is especially critical whenever a load, such as a motor having an initially high inrush current, is repetitively cycled by periodically opening and closing the contactor.

There is a need, therefore, for a circuit controller for a load, such as a motor, which does not require a circuit breaker and which is not subject to the internal temperature rise of a current limiter.

There is a more particular need for such a controller which protects a power circuit from damage under short circuit conditions.

There is an even more particular need for such a controller which is not damaged or seriously degraded under short circuit conditions.

There is another even more particular need for such a controller which interrupts short circuit currents.

There is yet another even more particular need for such a controller which limits the arcing of the separable contacts.

SUMMARY OF THE INVENTION

These and other needs are satisfied by the invention which is directed to a circuit controller for selectively connecting a power source to a load. The circuit controller includes an electrical switching mechanism and a substantially radiant energy dissipating, positive temperature coefficient current limiter. The switching mechanism selectively connects the power source to the load and switches a current which flows through the switching mechanism. The switching mechanism includes a current sensor for sensing the current which flows through the switching mechanism and providing a sensed current value. The switching mechanism further includes a switching controller for disconnecting the power source from the load whenever the sensed current value is above a predetermined current value. The substantially radiant energy dissipating, positive temperature coefficient current limiter is connected in series with the load and limits the short circuit current which flows through the switching mechanism whenever the power source is selectively connected to the load.

The switching mechanism may include a contactor having separable contacts which are responsive to the switching controller. Alternatively, the switching mechanism may further include a circuit interrupter which is connected in series with the separable contacts of the contactor between the power source and the load, in order to provide a separate circuit disconnection mechanism.

The substantially radiant energy dissipating current limiter includes a current limiting conductor having two ends. Preferably, a tungsten conductor is provided. Alternatively, a carbon conductor may be provided. The conductor is connected in series with the switching mechanism between the power source and the load.

The substantially radiant energy dissipating current limiter further includes a sealed tubular glass cylinder enclosure for enclosing the conductor therein. The enclosure has two copper ends, each of which are electrically connected to a corresponding end of the conductor within the enclosure. The two copper ends of the enclosure are electrically connected in series with the switching mechanism between the power source and the load. The current limiter may further include a ceramic cylinder about which the conductor is wound and supported within the enclosure.

In terms of cost, the current limiter preferably includes nitrogen gas enclosed within the sealed enclosure. Such a current limiter, including nitrogen gas and a tungsten conductor, dissipates greater than 70 percent of the energy of the short circuit current by radiation. Alternatively, any other non-oxidizing gas, such as helium, argon, krypton or a halogen gas mixture may be provided. In terms of radiant energy dissipation, the current limiter preferably includes krypton gas enclosed within the sealed enclosure. Such a current limiter, including krypton gas and a tungsten conductor, dissipates greater than 80 percent of the energy of the short circuit current by radiation. In terms of the operational lifetime of the current limiter, the current limiter preferably includes a halogen gas mixture enclosed within the sealed enclosure.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
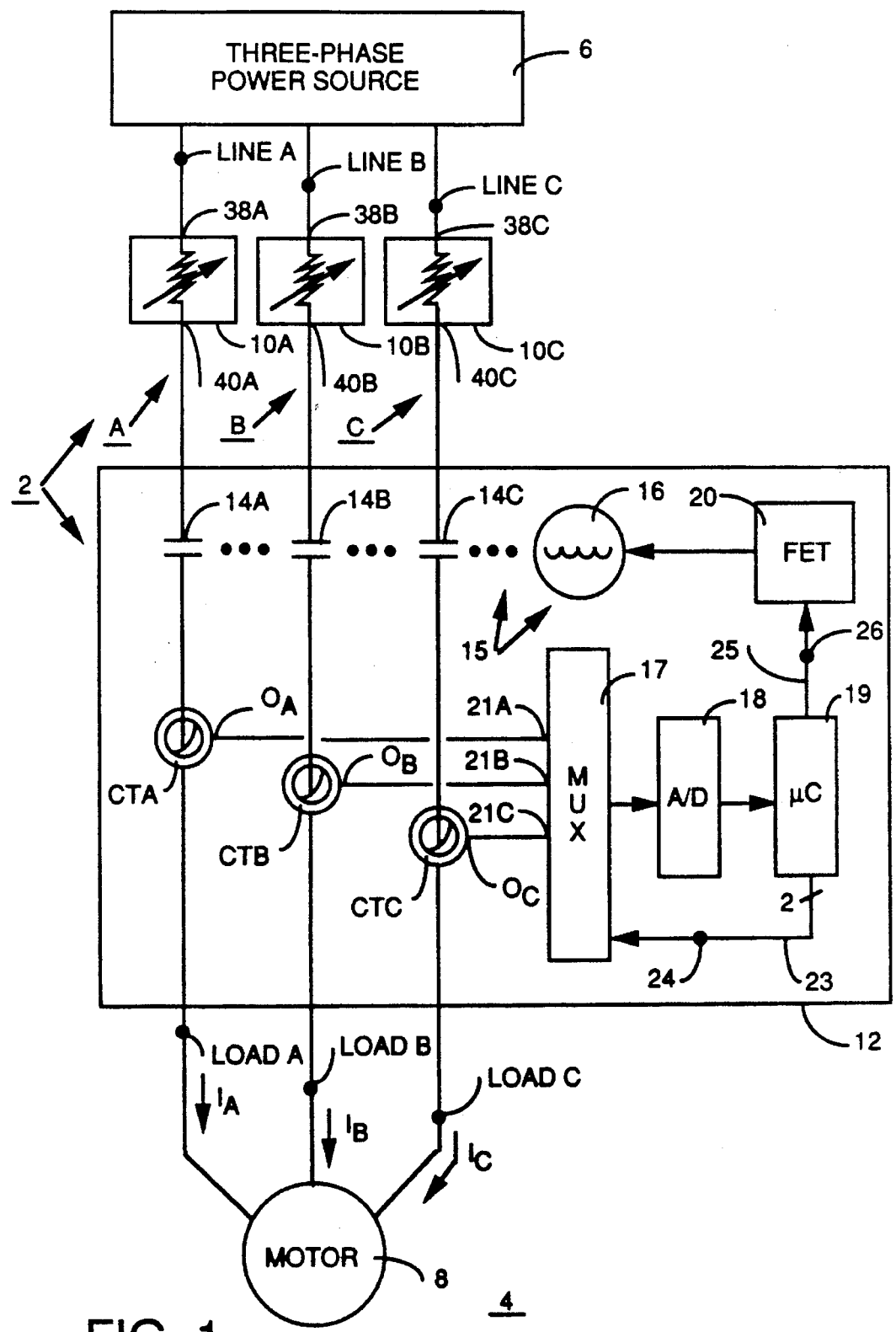
FIG. 1 is a block diagram of a circuit controller in accordance with the invention.

Referring to FIG. 1, a block diagram of a circuit controller 2 is illustrated. The exemplary controller 2 is configured in an exemplary power circuit 4 having a three-phase alternating current (AC) power source 6 and a three-phase AC load, such as the AC motor 8, it being understood that the invention is applicable to controllers, power sources and loads having any number of phases, and furthermore, it being understood that the invention is applicable to direct current (DC) controllers, power sources and loads. The controller 2 selectively connects three power line phases LINE A, LINE B, LINE C of the power source 6 to three power inputs LOAD A, LOAD B, LOAD C, respectively, of the motor 8. The controller 2 includes three current limiters 10A,10B,10C and an exemplary motor starter 12. The motor starter 12 includes three separable contacts 14A,14B,14C, an electromagnet 15 and a contactor coil 16.

Electromagnetic contactors are well known in the art; an example is disclosed in U.S. patent application Ser. No. 07/891,877, U.S. Pat. No. 5,315,471, issued May 24, 1994 to Rick A. Hurley et al. entitled "Coil Current Regulator with Induced Flux Compensation in an Electromagnetic Contactor System", which is herein incorporated by reference. A complete description of a motor-starting contactor is disclosed in U.S. Pat. No. 4,893,102, issued Jan. 9, 1990, which is herein incorporated by reference, it being understood that the present invention is applicable to a wide variety of electromagnetic switching devices, such as vacuum, air gap and insulating gas contactors or motor starters.

Each of the current limiters 10A,10B,10C is connected in series with the power inputs LOAD A, LOAD B, LOAD C, respectively, of the motor 8 and limit the three-phase currents which flow through the controller 2 whenever the power source 6 is selectively connected to the motor 8. Three power circuits A,B,C for the three phases are formed by the series connection of the power lines LINE A, LINE B, LINE C, the current limiters 10A,10B,10C, the separable contacts 14A,14B,14C, and the power inputs LOAD A, LOAD B, LOAD C, respectively.

The motor starter 12 also includes three current transformers CTA, CTB, CTC, a plural input analog multiplexer (MUX) 17, an analog-to-digital (A/D) converter 18, a microcomputer 19, and a field effect transistor (FET) drive circuit 20. The current transformers CTA, CTB, CTC sense the alternating currents $I_A, I_B, I_C$ which flow through the separable contacts 14A,14B,14C from the power lines LINE A, LINE B, LINE C, respectively. The MUX 17 includes three analog inputs 21A,21B,21C which are interconnected with outputs $O_A, O_B, O_C$ of the current transformers CTA,CTB,CTC, respectively. The microcomputer 19 selects one of the analog inputs 21A,21B,21C of the MUX 17 for conversion by the A/D 18 using selection signals 23 on two lines 24.

As discussed in more detail below with FIG. 8, the microcomputer 19 determines a sensed current value for each of the separable contacts 14A,14B,14C. Whenever any one of the sensed current values is above a predetermined current value, the microcomputer 19 outputs a control signal 25 on line 26 to the FET drive circuit 20. The FET drive circuit 20 regulates a pulsed direct current applied to the contactor coil 16. Whenever the coil 16 is energized, the separable contacts 14A,14B,14C are first closed and then are held closed in order to connect the three-phase power source 6 to the three-phase motor 8. On the other hand, whenever the coil 16 is deenergized, the separable contacts 14A,14B, 14C are opened, thereby disconnecting the power source 6 from the motor 8.

Figure 2:
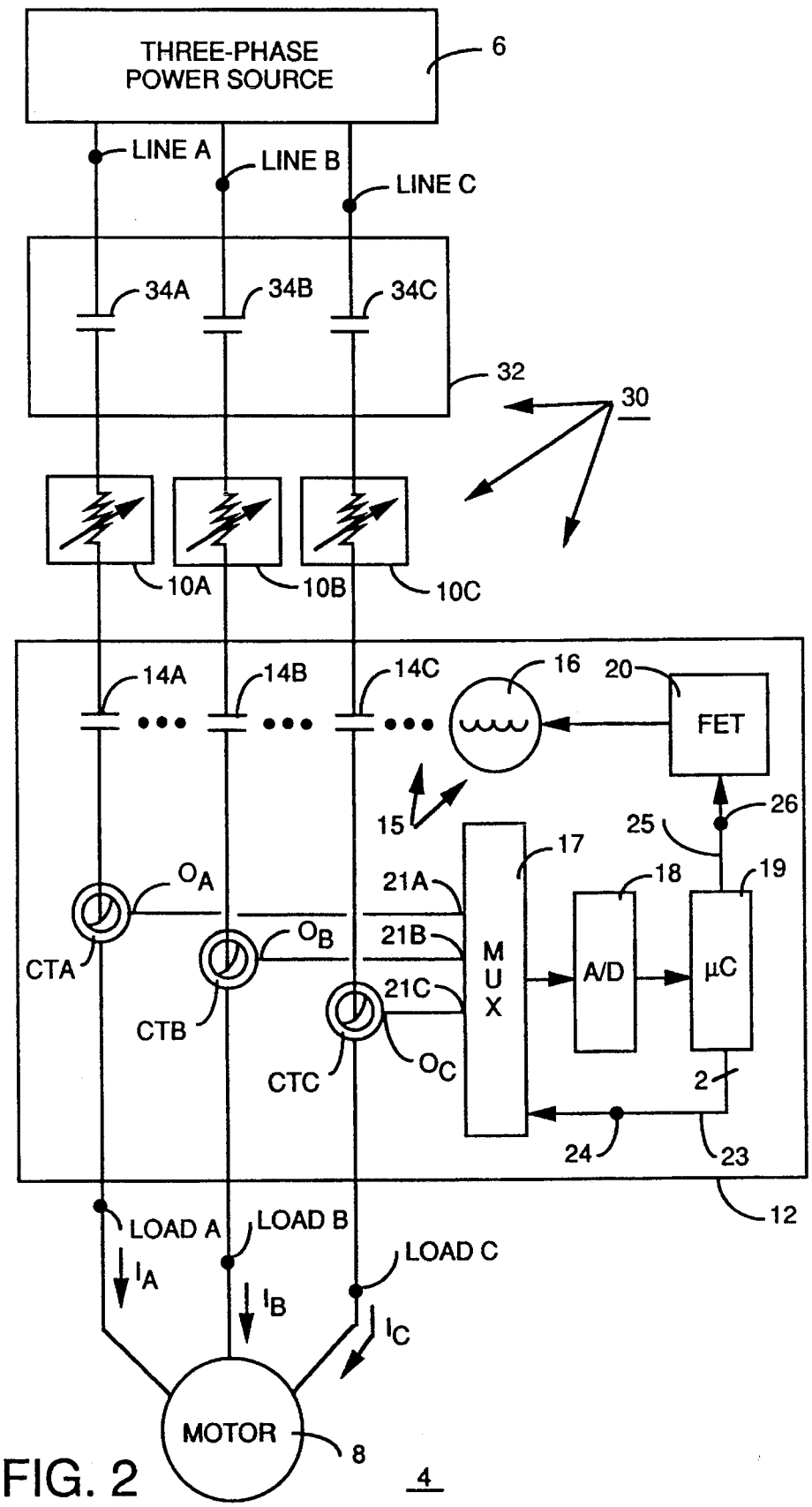
FIG. 2 is a block diagram of a circuit controller in accordance with an alternative embodiment of the invention.

Referring now to FIG. 2, a block diagram of an alternative embodiment of the circuit controller is illustrated. In this alternative embodiment, a circuit controller 30 includes an electromagnetic switching device, such as the exemplary motor starter 12, the current limiters 10A,10B,10C, and a separate disconnection mechanism, such as the exemplary circuit interrupter 32. The circuit interrupter 32 includes three separable contacts 34A,34B,34C which are connected in series between the three power lines LINE A,LINE B,LINE C and the current limiters 10A,10B,10C, respectively. The principal function of the circuit interrupter 32 and the separable contacts 34A,34B,34C is to provide a mechanism independent of the separable contacts 14A,14B,14C for disconnecting the three-phase power source 6 from the motor 8.

Figure 3:
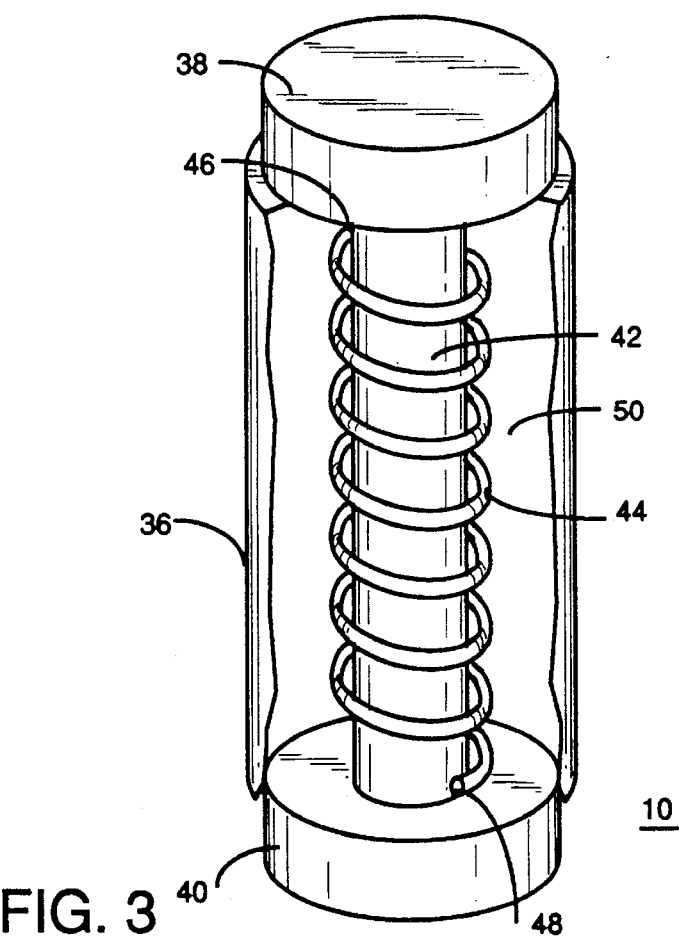
FIG. 3 is a cut-away isometric view of a substantially radiant energy dissipating, positive temperature coefficient current limiter in accordance with the invention.

FIG. 3 illustrates a cut-away isometric view of the exemplary current limiter 10 for one of the power circuits A,B,C of FIGS. 1 and 2. The current limiter 10 includes an exemplary tubular glass cylinder 36 having two copper terminals 38,40 at each end of the cylinder 36. The terminals 38,40 are electrically connected in series between the power source 6 and the motor starter 12. The exemplary current limiter 10 further includes a ceramic spool 42 and a conductor 44. The conductor 44 is wound and supported about the spool 42. The spool 42 and the conductor 44 are enclosed within the cylinder 36 between the terminals 38,40. The conductor 44 has two ends 46,48 which are electrically connected to the terminals 38,40, respectively, within the cylinder 36. Accordingly, the conductor 44 is connected in series with the motor starter 12 between the power source 6 and the motor 8.

In terms of cost, availability, flexibility and performance, the conductor 44 is preferably a tungsten wire. Alternatively, the conductor 44 may be of carbon composition. The current limiter 10 further includes a non-oxidizing gas 50 which is sealed inside the cylinder 36 with the spool 42 and the conductor 44. Preferably, in terms of cost, the non-oxidizing gas 50 is nitrogen. Alternatively, any other non-oxidizing gas, such as helium, argon, krypton or a halogen gas mixture may be provided. The halogen gas mixture may include various mixtures of nitrogen and iodine, helium and iodine, argon and iodine, krypton and iodine, nitrogen and bromine, helium and bromine, argon and bromine, or krypton and bromine. In terms of the operational lifetime of the current limiter, the halogen gas mixture is preferred. Table I, below, provides various dimensions for the exemplary current limiter 10 in which the conductor 44 has seven turns about the spool 42.

TABLE I

| DIMENSION OF ITEM | (inches) |
| --- | --- |
| LENGTH OF CONDUCTOR 44 | 24.0 |
| DIAMETER OF CONDUCTOR 44 | 0.040 |
| THICKNESS OF TERMINALS 38,40 | 0.5 |
| DIAMETER OF TERMINALS 38,40 | 2.0 |
| LENGTH OF SPOOL 42 | 3.5 |
| DIAMETER OF SPOOL 42 | 0.75 |
| LENGTH OF CYLINDER 36 | 3.5 |
| DIAMETER OF CYLINDER 36 | 2.25 |
| LENGTH OF CURRENT LIMITER 10 | 4.5 |

As described in greater detail below, the exemplary current limiter 10 has a positive temperature coefficient resistance which increases with corresponding increases in temperature of the current limiter 10. Furthermore, changes in the temperature of the current limiter 10 are determined by resistive ($I^2R$) heating of the current limiter 10. In other words, the current limiter 10 exhibits a relatively low resistance to a flow of electrical current when the current is below a threshold value (e.g., when the current is less than or equal to the rated current of the motor starter 12). However, current above the threshold value flowing through the current limiter 10 causes further resistive heating and a corresponding rise in internal temperature of the current limiter 10. In turn, this causes the current limiter 10 to transition to a state of higher resistance, thereby limiting current flow through the current limiter 10 to the motor 8.

The exemplary current limiter 10 dissipates power by $I^2R$ heating, as discussed above, and also through radiant energy. In terms of cost, the current limiter 10 having the preferred tungsten conductor and the preferred nitrogen gas enclosed within the sealed enclosure dissipates greater than 70 percent of the energy of the short circuit current by radiation. Alternatively, in terms of radiant energy dissipation, the current limiter 10 having the preferred tungsten conductor and the preferred krypton gas enclosed within the sealed enclosure dissipates greater than 80 percent of the energy of the short circuit current by radiation. In either case, the $I^2R$ heating of the current limiter 10 is substantially reduced in comparison to conventional current limiters.

Figure 4:
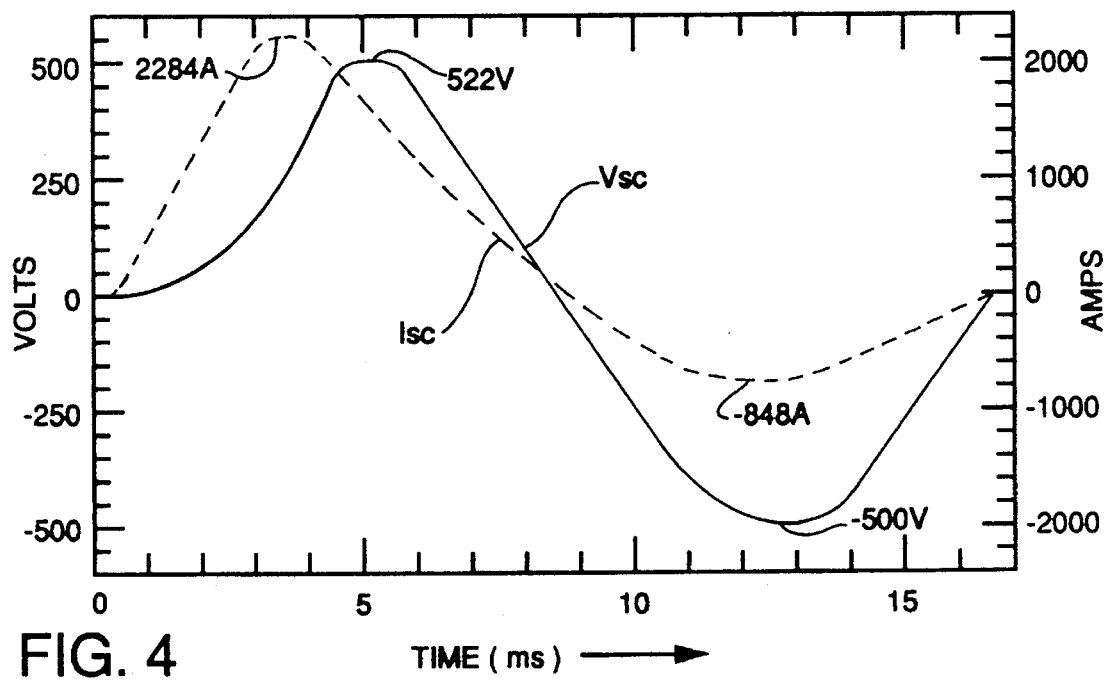
FIG. 4 is a graph of circuit controller short circuit fault current and voltage with respect to time in accordance with the invention.

Referring now to FIGS. 1 and 4, FIG. 4 illustrates a graph of short circuit fault current ($I_{sc}$) flowing through, and voltage ($V_{sc}$) across, a single-phase tungsten current limiter 10 (see FIG. 3 and Table I above) with respect to time for one power line cycle (e.g., 16.667 ms). The exemplary power source 6 provides 440 VAC (rms), 60 Hz power and is capable of sourcing 100 KA, it being understood that the invention is applicable to power sources having any voltage, frequency or current capacity. The initial resistance of the exemplary current limiter 10 is 0.0417 Ω.

During the first AC half-cycle of the power source 6, the peak current is limited to 2284 A. During the second AC half-cycle, the peak current is limited to 848 A. This peak current is substantially less than the short circuit current of conventional power systems that utilize a circuit breaker, but not a current limiter. During the first AC half-cycle, the peak voltage across the current limiter 10 is 522 V, and during the second AC half-cycle, the peak voltage is 500 V.

Figure 5:
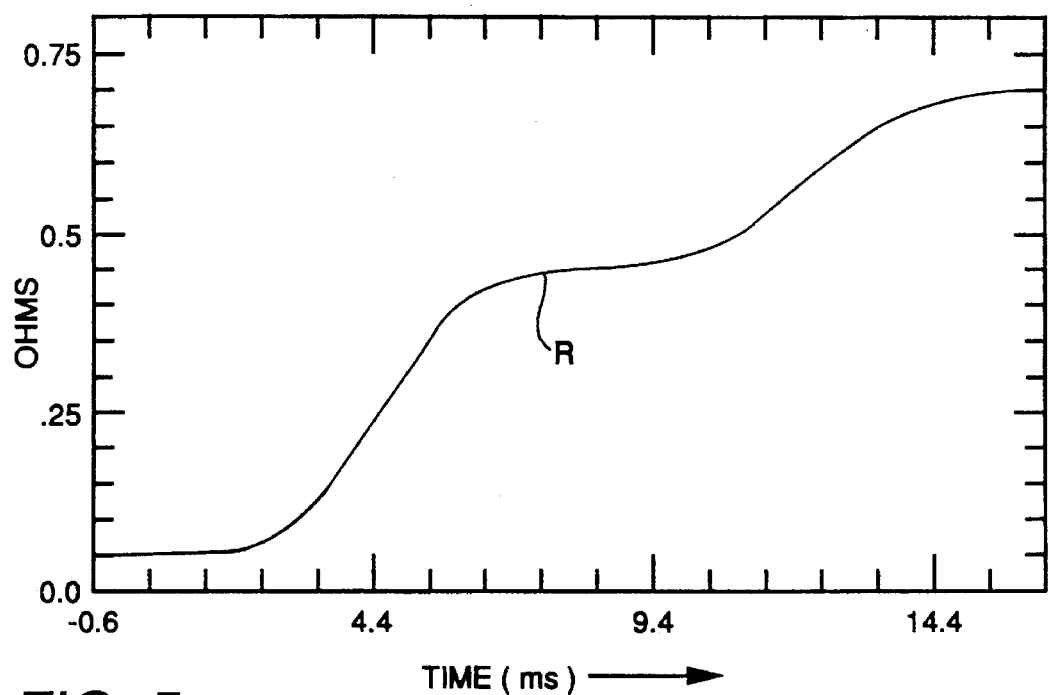
FIG. 5 is a graph of current limiter resistance with respect to time in accordance with the invention.
Figure 6:
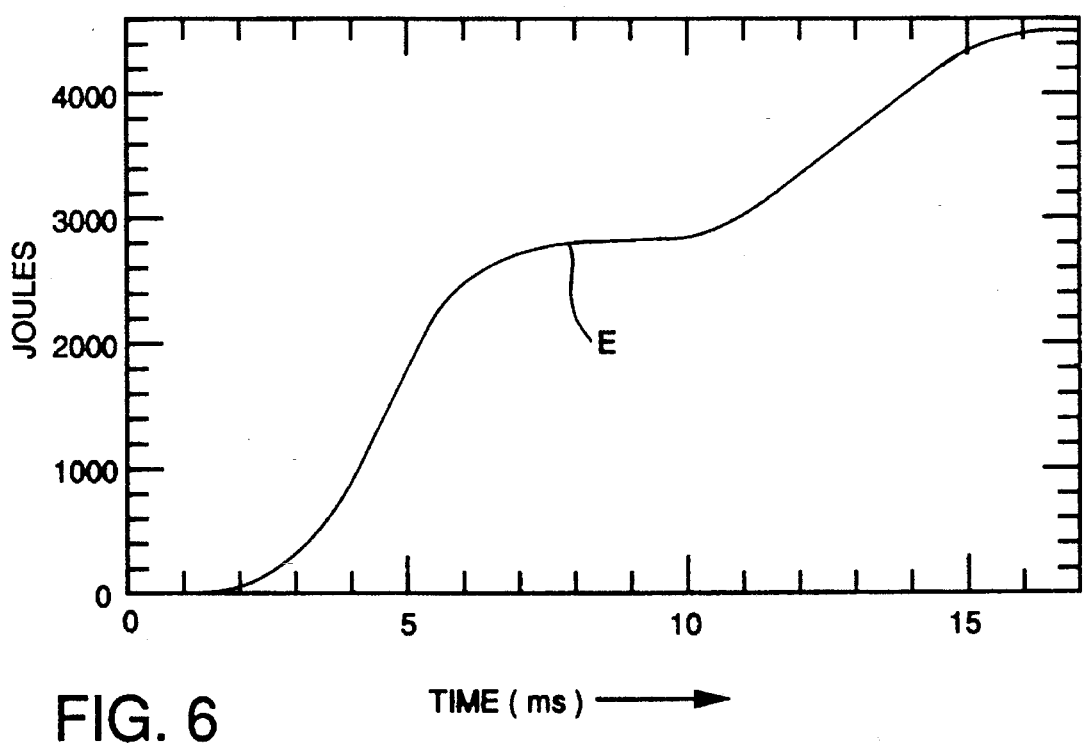
FIG. 6 is a graph of current limiter energy dissipation with respect to time in accordance with the invention.

Referring now to FIGS. 1, 5 and 6, FIG. 5 illustrates a graph of current limiter resistance (R) for a single-phase tungsten current limiter 10 (see FIG. 3 and Table I above) with respect to time for one power line cycle (e.g., 16.667 ms). During the first AC half-cycle of the power source 6, the resistance rapidly increases from the initial resistance of 0.0417 Ω to approximately 0.475 Ω. Whenever the short circuit fault current ($I_{sc}$; see FIG. 4) is near the zero-crossing between the first and second AC half-cycles, the resistance is relatively constant. Then, during the second AC half-cycle, the resistance rapidly increases from approximately 0.475 Ω to approximately 0.70 Ω. The ratio of the final resistance after one AC cycle to the initial resistance is greater than 16. The initial resistance corresponds to an ambient temperature whenever zero current flows through the current limiter 10. The final resistance corresponds to a second temperature which is higher than the ambient temperature whenever the short circuit fault current ($I_{sc}$) flows through the current limiter 10.

FIG. 6 illustrates a graph of current limiter $I^2R$ energy dissipation (E) for a single-phase tungsten current limiter 10 (see FIG. 3 and Table I above) with respect to time for one power line cycle (e.g., 16.667 ms). During the first AC half-cycle of the power source 6, the energy rapidly increases to approximately 2800 joules (VA-s). Whenever the short circuit fault current ($I_{sc}$; see FIG. 4) is near the zero-crossing between the first and second AC half-cycles, the energy is relatively constant. Then, during the second AC half-cycle, the energy rapidly increases to approximately 4500 joules.

Figure 7:
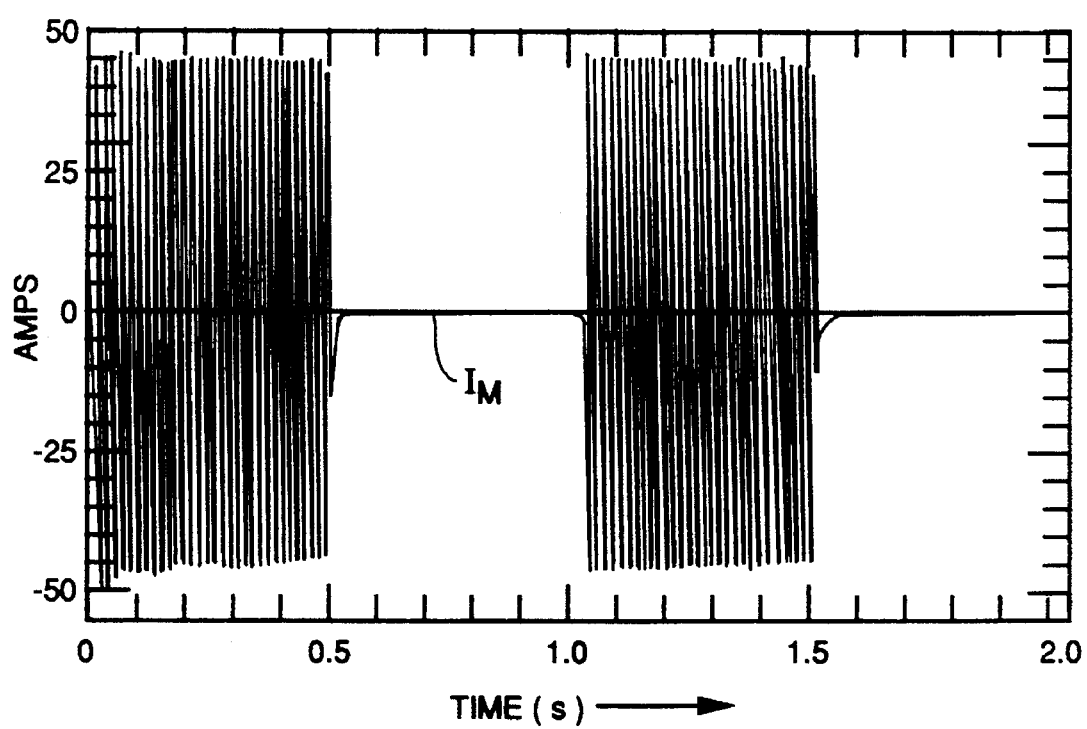
FIG. 7 is a graph of repetitively switched motor current with respect to time in accordance with the invention.

Referring now to FIGS. 1 and 7, FIG. 7 illustrates a graph of repetitively switched motor current ($I_M$) which flows through a single-phase tungsten current limiter 10 (see FIG. 3 and Table I above) with respect to time. The motor 8 is repetitively switched on for 500 ms, and then off for 500 ms, by the motor starter 12. During each 500 ms on period, the peak value of motor current ($I_M$) is substantially constant at approximately 47 A. Because of the initial current inrush of the exemplary motor 8, this peak current is higher than the 10 A rated current of the exemplary motor starter 12. During this repetitive switching of the motor 8, the resistance of the exemplary current limiter 10 increases from the initial resistance of 0.0417 Ω to approximately 0.0803 Ω.

Figure 8:
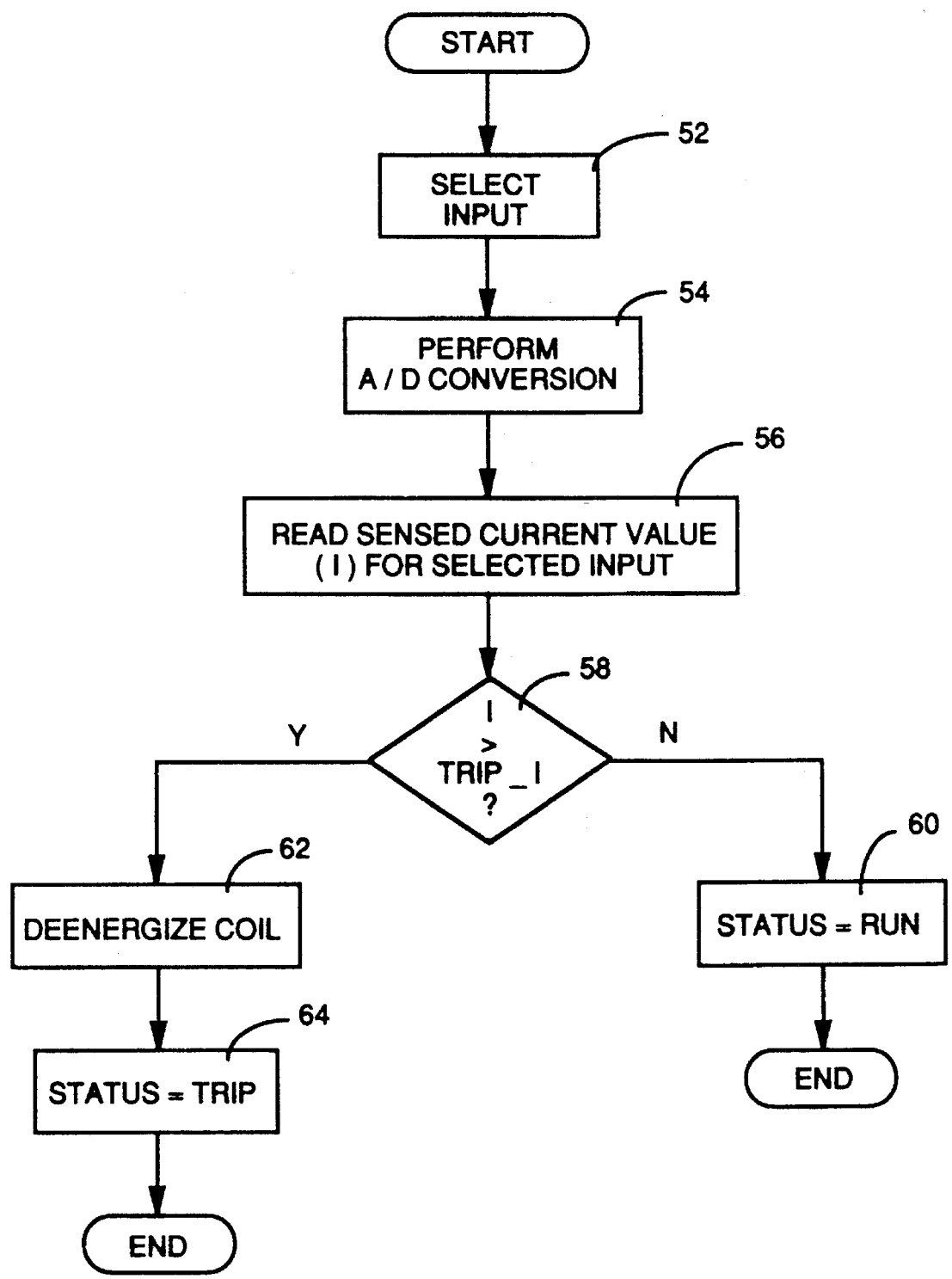
FIG. 8 is a flowchart of circuit controller microcomputer firmware.

Referring to FIGS. 1 and 8, FIG. 8 is a flowchart of the firmware of the microcomputer 19 of the motor starter 12. The microcomputer 19 determines the sensed current values $I_A, I_B, I_C$ for the separable contacts 14A, 14B, 14C, respectively, and operates the FET drive circuit 20 to disconnect the power source 6 from the load 8 whenever any one of the sensed current values $I_A, I_B, I_C$ is above a predetermined current value. In the exemplary embodiment, the steps 52–64 of FIG. 8 are executed four times for every power line cycle of the AC power source 6, in order to determine whether to deenergize the coil 16. In this manner, a short circuit fault current through any of the separable contacts 14A, 14B, 14C is interrupted within two power line cycles of the AC power source 6.

At step 52, the microcomputer 19 selects one the analog inputs 21 using the selection signals 23. Next, at step 54, the analog-to-digital conversion is completed by A/D 18. At step 56, the microcomputer 19 reads the sensed current value (I) for one of the three analog inputs 21. Then, at step 58, the sensed current value (I) is compared to a trip current (TRIP_I) for the motor starter 12. If I is less than or equal to TRIP_I, then at step 60, a status mode (STATUS) is set to a RUN condition and the routine exits. On the other hand, if I is greater than TRIP_I, then at step 62, the control signal 25 is used to deenergize the coil 16 at step 62. Finally, at step 64, the status mode (STATUS) is set to a TRIP condition and the routine exits.

In the exemplary embodiment, the predetermined current value, TRIP_I, is set to 1500 percent of the rated current of the motor starter 12. This predetermined current value is less than the short circuit current which is limited by the current limiter 10. Under short circuit fault conditions, the microcomputer 19 determines that one of the currents $I_A, I_B, I_C$ is above this predetermined value and disconnects the power source 6 from the load 8 within two power line cycles of the power source 6.

Accordingly, the exemplary circuit controller 2 provides an improvement in cost, reliability and operational lifetime (i.e., 10 to 100 short circuit current limiting operations) in comparison to conventional circuit breakers (i.e., 3 operations) or fuses (i.e., 1 operation). Furthermore, the exemplary current limiter 10 provides improved current limiting, reduced $I^2R$ power dissipation, better load protection, and an elimination of plasma and excessive visual display caused by contact arcing under short circuit conditions.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed:

1. A circuit controller apparatus for selectively connecting a power source to a load, said apparatus comprising:

electrical switching means for selectively connecting said power source to said load and switching a current which flows from said power source and through said electrical switching means, said electrical switching means including current sensing means for sensing the current which flows through said electrical switching means and providing a sensed current value, and also including switching control means for disconnecting said power source from said load whenever the sensed current value is above a predetermined current value;

radiant energy dissipating, positive temperature coefficient current limiting means in series with said load for limiting the current which flows through said electrical switching means whenever said power source is selectively connected to said load;

wherein said radiant energy dissipating, positive temperature coefficient current limiting means includes a tungsten conductor which is connected in series with said electrical switching means between said power source and said load;

wherein said tungsten conductor has two ends, and wherein said radiant energy dissipating, positive temperature coefficient current limiting means further includes:

sealed enclosure means for enclosing said tungsten conductor therein, said sealed enclosure means having two conductive ends, each of the two ends of said tungsten conductor being electrically connected to a corresponding one of the two conductive ends within said sealed enclosure means, the two conductive ends of said sealed enclosure means being electrically connected in series with said electrical switching means between said power source and said load;

non-oxidizing gas means enclosed within said sealed enclosure means; and wherein said sealed enclosure means further includes mandrel means for winding said tungsten conductor thereabout.

2. The apparatus as recited in claim 1 wherein said mandrel means is a ceramic cylinder.

3. A circuit controller apparatus for selectively connecting a power source to a load, said apparatus comprising:

electrical switching means for selectively connecting said power source to said load and switching a current which flows from said power source and through said electrical switching means, said electrical switching means including current sensing means for sensing the current which flows through said electrical switching means and providing a sensed current value, and also including switching control means for disconnecting said power source from said power source from said load whenever the sensed current value is above a predetermined current value;

tungsten current limiting means in series with said load for limiting the current which flows through said electrical switching means whenever said power source is selectively connected to said load;

wherein said tungsten current limiting means includes:

a tungsten conductor having two ends;

sealed enclosure means for enclosing said tungsten conductor therein, said sealed enclosure means having two conductive ends, each of the two ends of said tungsten conductor being electrically connected to a corresponding one of the two conductive ends within said sealed enclosure means, the two conductive ends of said sealed enclosure means being electrically connected in series with said electrical switching means between said power source and said load;

non-oxidizing gas means enclosed within said sealed enclosure means; and wherein said sealed enclosure means further includes mandrel means for supporting said tungsten conductor.

* * * * *